April 16, 1968  C. H. SCHUH  3,378,195
SLIDE RULE PEN
Filed Jan. 6, 1967
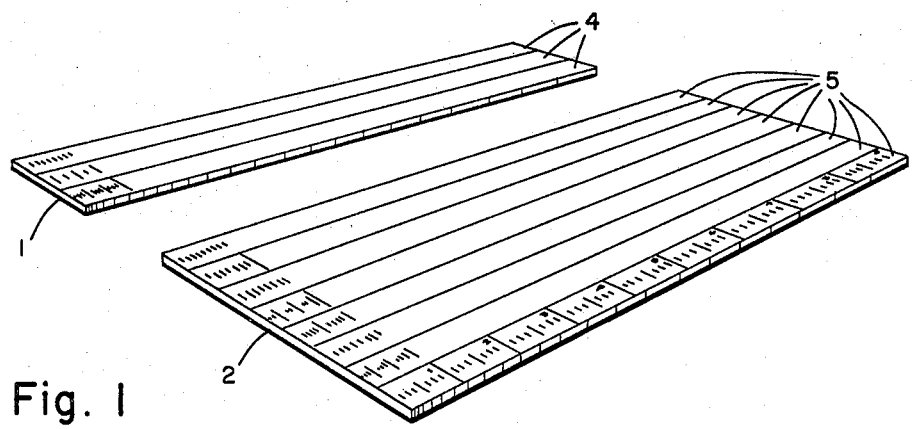
Fig. 1
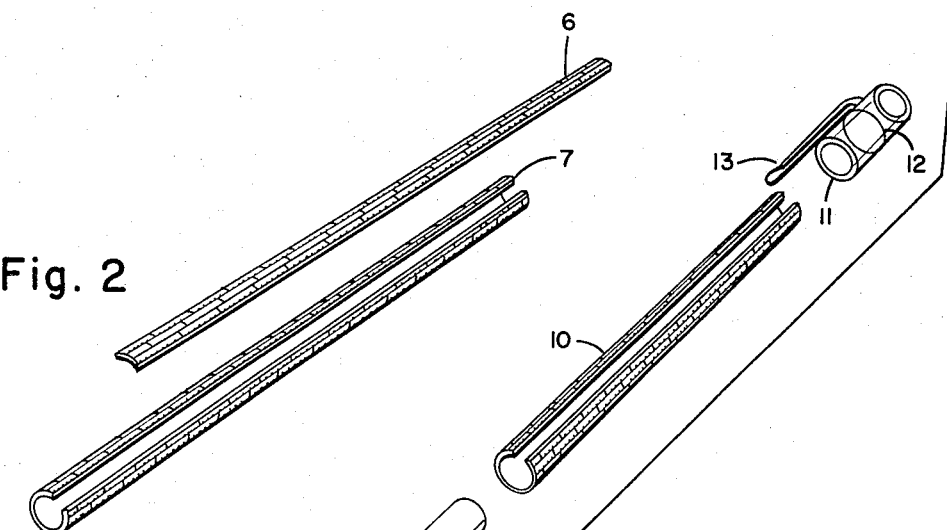
Fig. 2
Fig. 3
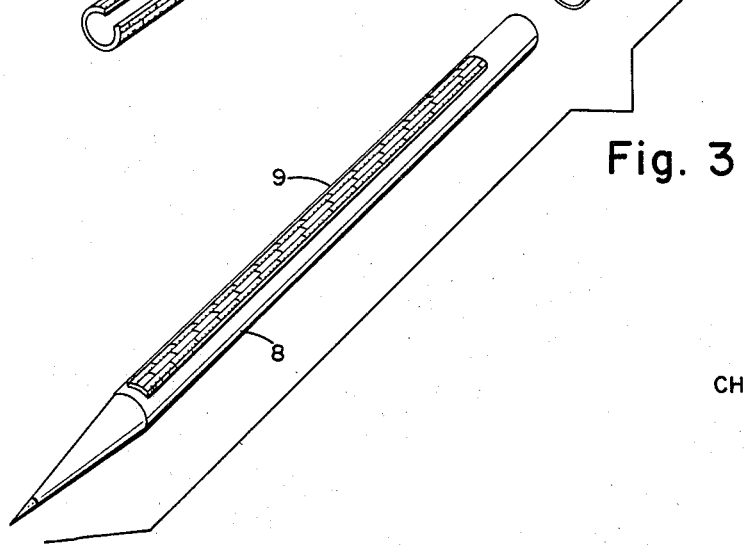
INVENTOR
CHARLES H. SCHUH

United States Patent Office 3,378,195
Patented Apr. 16, 1968

---

3,378,195
SLIDE RULE PEN
Charles H. Schuh, 430 Appian Way,
St. Petersburg, Fla. 33704
Filed Jan. 6, 1967, Ser. No. 607,847
2 Claims. (Cl. 235—64)

ABSTRACT OF THE DISCLOSURE

A multi-scale slide rule pen comprising a writing pen covered by a single, thin, surface layer of post molded, thermoplastic encased, printed paper laminate in two sections, one permanently attached and the other slidable longitudinally, and an indicator with a circular hairline making contact with all the scales.

---

This invention relates to an improved plastic bag ularly to a pen or pencil slide rule. Moreover it relates to what is herein referred to as a "wrap-around" slide rule. This term will be explained in detail hereinafter.

The standard slide rule consists of three parts, (1) the stator or base member (2) the slide and (3) the cursor or indicator. In the slide rule of the present invention the stator and the slide are in a sense reversed, that is, the basic member (pen or pencil) becomes the slide and carries the usual slide scales, while the sliding member carries the scales usually present on the stator bars. Also the sliding member wraps around the basic member and slides over it instead of being stationary bars between which the slide moves.

The advantages of the present invention are as follows:

(1) In the wrap around slide rule the sliding member can be made very thin, for example two to five hundredths of an inch thick, since it wraps around the stator member and this makes possible a pen or pencil slide rule of normal diameter and dimensions.

(2) The principal advantage of a pen or pencil slide rule is that it is normally carried by the user at all times and is therefore always conveniently available. It should not be heavier or bulkier than the normal pen or pencil and this becomes possible with the wrap around construction and design.

(3) The wrap around slide rule requires no adjustment for tension since the sliding member acts like a spring and always exerts the proper amount of tension on the basic member or stator maintaining the proper amount of tension or friction, without the use of adjustment screws which increase weight and bulk.

(4) The simplicity of design of the wrap around slide rule leads to easy manufacturing and low cost. There is no mortise and tenon joint which requires machining and fitting, as in the standard slide rule.

(5) The wrap around slide rule is well adapted to manufacturing from all plastic parts.

A description of the construction and use of the pen or pencil slide rule of the present invention follows.

FIG. 1 shows two laminates (1 and 2) each comprising a thin sheet of paper laminated between clear thermoplastic sheets, that is encased in plastic in the customary manner. On the paper prior to lamination are printed the appropriate slide rule scales, shown at 4 and 5. The set of scales (4 on laminate 1) are those usually found on the slide of the standard slide rule, for example, the C, S and T scales. The set on laminate 2 are those usually found on the stator bars of the standard slide rule, for example, the D, LL–1, LL2, LL3, LL01, LL02 and LL03 scales.

FIG. 2 shows these same two laminates (at 6 and 7) formed into cylindrical segments of a diameter slightly less than the diameter of the pen which is to be a part of the completed slide rule. The sheets are curved by heating the laminate to the softening point and then placing in a suitable mold to shape and then cooling in the mold to provide a permanent set.

FIG. 3 shows the three elements of the pen or pencil slide rule ready to be assembled. The pen with the narrow strip (6 of FIG. 2) cemented to it is shown at 8. The cylindrical element (7 of FIG. 2) is shown at 10 ready to be slid over the pen. The cursor or indicator is shown at 11, ready to be slid over the rest of the assembly. The cursor is simply a short piece of clear, thermoplastic tubing of the right diameter to fit tightly over the rest of the assembly, with a circular hairline (12) marked on the inside of it. There may also be attached to it, a pocket clip of standard design, as shown at 13.

In order to achieve the proper degree of tension and consequent sliding resistance of element 7 (the slide) the diameter is made slightly less than that of the pen, the amount depending on the degree of ease of sliding desired, usually a few hundredths of an inch will suffice or preferably in the range of about one to four hundredths of an inch less than the pen diameter. The indicator ring is made to just fit over the rest of the assembly with some degree of resistance to sliding so that it will remain where positioned. Some further sliding resistance may be provided by the pocket clip which fits around and is attached to the indicator. The clip also aids in moving the indicator small amounts for fine settings by providing greater thickness to push against than the plastic ring which is very thin.

A further requirement is that the indicator ring must move with the sliding cylindrical laminate when it is being slid over the pen or pencil. This is accomplished by having the area of the cylindrical laminate greater than 60% and preferably about 70% to 80% of the surface area of the pen or pencil, excluding any area extending beyond the scales. This also means that the circular cross section of the cylindrical laminate will extend more than half way around the pen or pencil surface, and this will prevent it from falling away from the pen or pencil. In other words, the cylindrical laminate will cling to the pen or pencil at all times, as indicated in the illustration. The two laminates carrying all the slide rule scales will extend all the way around the pen or pencil and cover the entire surface area thereof.

With this assembly and appropriate slide rule scales the completed pen slide rule can perform the functions of the standard slide rule. It has been found that about 4½ to 5 inches of scale length will provide satisfactory reading and pen or pencil length. The pen or pencil of this invention must be of uniform diameter throughout its length except the tapered point and any tapered or rounded end extending beyond the scales.

It has also been found three slide rule scales can easily be placed on the laminate attached to the pen and eight slide rule scales on the cylindrical sliding laminate. Due to the wrap around construction this can be done with the overall diameter of the slide rule pen being substantially that of average pen size, and still have easily legible scales. In other words, a total of eleven scales are possible with the slide rule of this invention of normal pen size and this makes possible the construction of not only a beginners slide rule but also a log log slide rule for the engineer in the form of a pen slide rule.

Any other sets of slide rule scales can of course be used with this invention for various calculating purposes. The art of laminating and the thermoplastic laminating materials used, such as Tenite, Vinylite, etc., are well known and any choice here will rest on the usual preferences of one material over another. The scales can be produced photographically or printed on appropriate, thin, quality paper suitable for laminating by standard laminating procedures.

In the following claims the term pen is used to designate a ball point pen and a fountain pen as well as a pencil, all being made of uniform diameter throughout their length, except for the tapered point or end. The term A scales refers to the scales normally found on the slide and the term B scales refers to the scales normally found on the stator bars of the standard slide rule.

Having thus described my invention in detail, I claim:

1. A multi-scale slide rule pen of normal pen size, having a uniform, circular cross sectional area throughout its scale length, comprising a writing pen entirely covered by a thin surface layer of post molded, thermoplastic encased, printed paper laminate in two longitudinal sections, one narrow and one wide, said narrow section being permanently cemented to the writing pen and said wide section being free to slide along the writing pen surface, both sections butting together tightly and lying in the same circular plane, and an indicator with a circular hairline making contact with all of the scales throughout all of the scale length.

2. A multi-scale slide rule pen as claimed in claim 1, in which the number of slide rule scales is at least ten, including the log log and trigonometric scales, and in which the thickness of the laminate is about 0.02 in. to 0.05 inch and in which the diameter of the curved post laminate is about 0.01 in. to 0.04 inch less than the diameter of the writing pen, and which has a pocket clip attached to the indicator, and in which the writing pen is a ball point pen.

References Cited

UNITED STATES PATENTS

| | | | |
|---|---|---|---|
| 883,800 | 4/1908 | Harlow | 235—64 |
| 1,774,177 | 8/1930 | Harris | 235—64 |
| 2,777,636 | 1/1957 | Weiser | 235—64 |
| 3,147,915 | 9/1964 | Cresswell | 235—64 |
| 3,261,548 | 7/1966 | Riehle | 235—64 |

RICHARD B. WILKINSON, *Primary Examiner.*

STANLEY A. WAL, *Assistant Examiner.*